Aug. 31, 1965 R. E. LASSITER 3,203,414
STEAM HEATING DEVICE
Filed Nov. 4, 1963 2 Sheets-Sheet 1
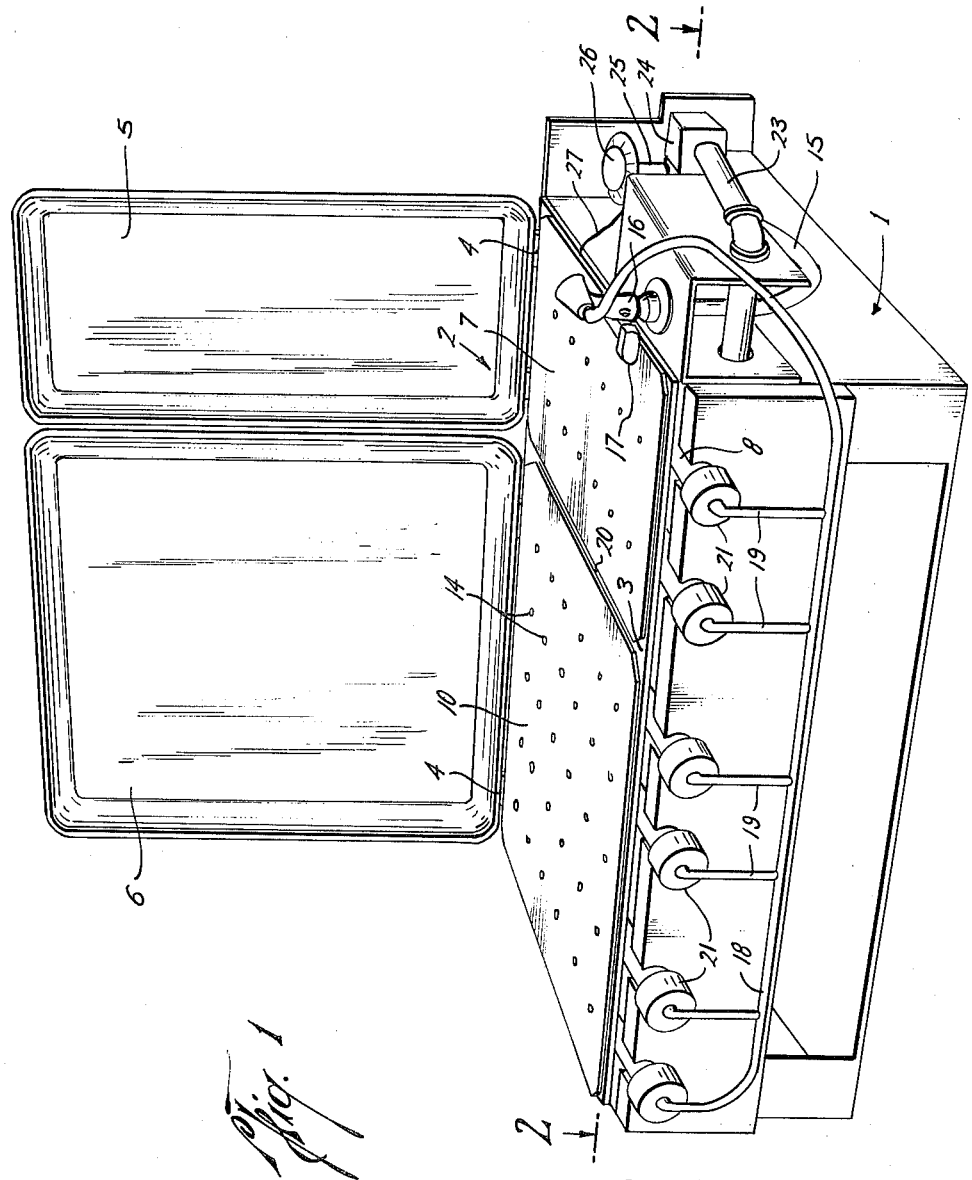
Rush E. Lassiter
INVENTOR.
BY Arnold, Roylance & Harris
ATTORNEYS

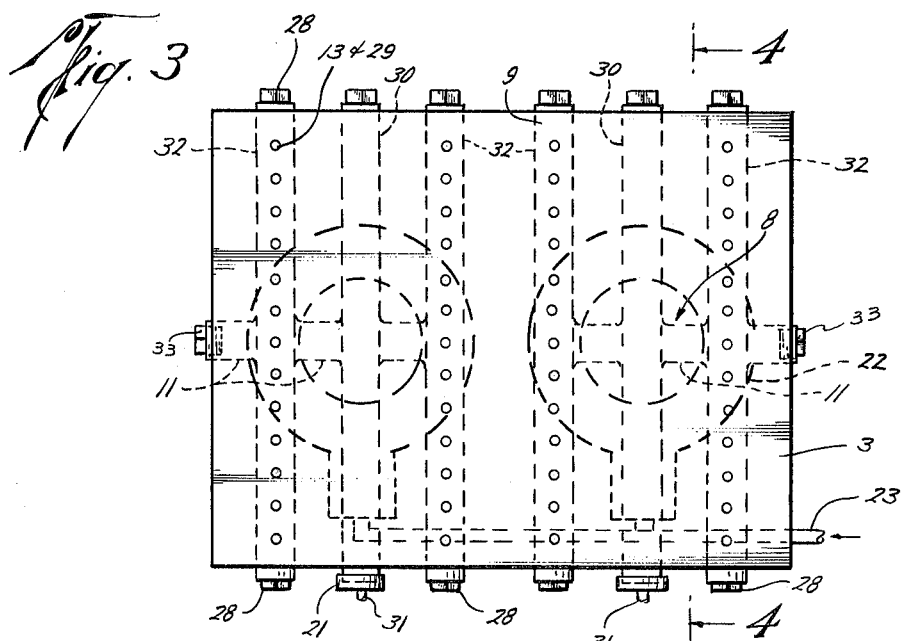
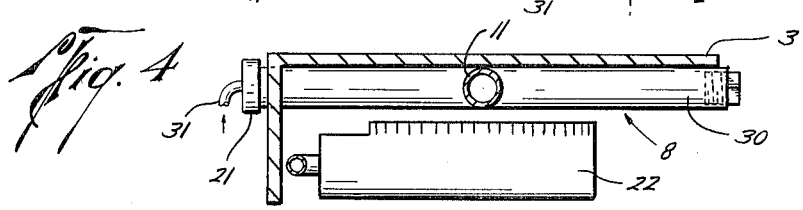
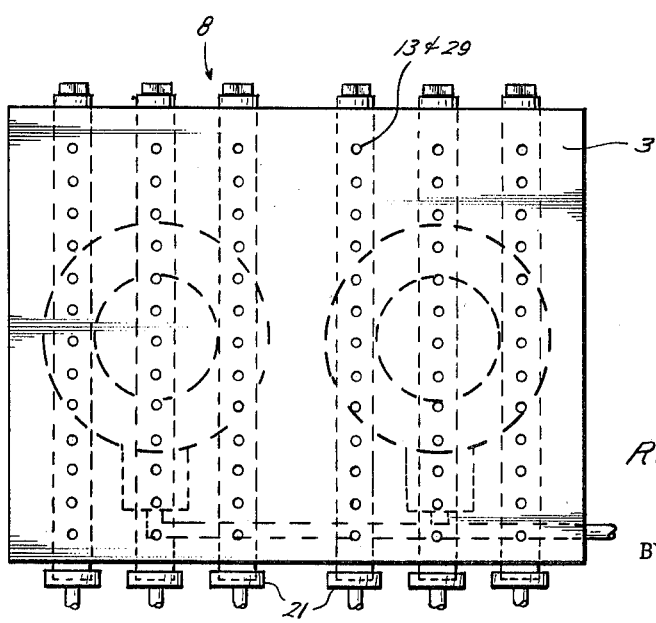

United States Patent Office 3,203,414
Patented Aug. 31, 1965

3,203,414
STEAM HEATING DEVICE
Rush E. Lassiter, 1722 W. Thomas St., Hammond, La.
Filed Nov. 4, 1963, Ser. No. 321,225
9 Claims. (Cl. 126—369)

This invention relates to devices for heating articles with steam and more particularly to devices which employ a steam generating chamber which permits easy removal of scales or mineral deposits accumulated in the chamber when water containing the minerals is evaporated therein.

Prior art devices such as Klemm, 2,973,705; Rittberger, 1,809,867; and Lewis, 2,674,935, all teach the use of steam to heat food products and the like. The steam is usually generated in a steam generating chamber which comprises a large dish shaped recess carried by the housing and into which water is injected and evaporated. These recesses are, generally speaking, relatively expensive to cast and very difficult and cumbersome to remove and clean. Often it is necessary to almost completely disassemble the device before the steam generating chamber is accessible to be cleaned.

It is therefore an object of this invention to provide devices for the steam heating of articles which employ a steam generating chamber readily accessible for cleaning and readily cleanable.

Generally, the invention comprises an enclosure for containing the articles to be heated by steam communicated to the enclosure from a steam generating chamber which employs at least one elongated member having an opening through which water in liquid or vapor state can be introduced and at least one end which is closed by an easily removable plug so that access may be easily had to the interior of the elongated member for removal of mineral scales deposited thereon by evaporating water. There are of course means provided for introducing water into the steam generating chamber and for evaporating the water once provided.

More specifically, in the drawings:
FIG. 1 is an isometric representation of a steam heating device which employs one embodiment of the invention.
FIG. 2 is a plan view along line 2—2 of FIG. 1.
FIG. 3 is a plan view smililar to that of FIG. 2 except that a different embodiment of the steam chamber 8 is illustrated.
FIG. 4 is a section view along lines 4—4 of FIG. 3.

In the drawings the following reference numerals have been used to indicate parts as follows:

(1) frame
(2) enclosure means
(3) bottom apertured plate
(4) hinge
(5) cover
(6) cover
(7) supporting plate
(8) steam generating chamber
(9) elongated members
(10) supporting plate
(11) conduits
(12) not used
(13) apertures
(14) apertures
(15) water inlet line
(16) valve
(17) lever
(18) water line
(19) water line extensions
(20) space
(21) plug
(22) gas burner
(23) gas line
(24) valve
(25) thermostat
(26) control dial
(27) temperature sensing element
(28) plug
(29) apertures
(30) elongate member
(31) water inlet line
(32) elongated members
(33) plugs As exemplified by the embodiment illustrated in FIGS. 1 and 2 of the drawings, steam heating devices which embody the invention may comprise a main frame or housing 1 which supports enclosure means 2. Enclosure means 2, provided to house the articles to be heated by steam, may conveniently have a bottom defined by apertured plate 3, to the rear of which hinges 4 pivotally carry the two shell shaped separately movable covers 5 and 6. Cover 5 is adapted to be lowered like the lid of an automobile trunk until it covers article supporting apertured plate 7 which is supported in a parallel relationship above plate 3 by any suitable means. Similarly cover 6 is adapted to be lowered over article supporting apertured plate 10 which is also spaced in a parallel relationship above plate 3 by any suitable means. To permit the covers 5 and 6 to be lowered over plates 7 and 10, respectively, there is provided a space 20 between plates 7 and 10. Thus, by using the divided covers 5 and 6 enclosure means 2 has two compartments in which different type articles may be placed and separately heated although it is obvious that a single cover could be used to form a single compartment.

As is obvious, pivotal movement of either of the covers 5 and 6 will allow an operator of the device to place articles to be heated into or remove articles after heating from the enclosure means 2.

Means are also provided for communicating steam to enclosure 2 and in the embodiments of the invention illustrated in FIGS. 1 and 2 the means conveniently take the form of steam generating chamber 8 which may comprise a plurality of elongated members 9 which in the embodiments illustrated take the form of pipes. Steam chamber 8 may be secured immediately below bottom plate 3 by welds or any other suitable means, or in the alternative chamber 8 may be positioned at some other point from which steam generated therein can be conveniently communicated to enclosure 2.

To allow steam communication from steam generating chamber 8 to the enclosure means 2, apertures 13 in elongated members 9 are provided to register with apertures 29 in bottom plate 3. Apertures 13 and 29 because they register one with the other are indistinguishable in the views illustrated by FIGS. 2 and 3. Steam passes from elongated members 9 through the registering apertures 13 and 29 into enclosure 2 where it passes upward through apertures 14 in supporting plates 7 and 10 and contacts the articles to be heated. Obviously other means may be employed to communicate steam generated in chamber 8 into enclosure 2 such as providing a small steam conduit between the elongated members 9 and enclosure 2 or by providing slots in the elongated members 9 and plates 3 or some other such expedient, all of which are obvious to one skilled in the art.

As is also obvious, means must be provided to commuunciate water to the steam generating chamber 8 and also to heat the water once provided so that it may be converted into steam.

In the particular embodiment illustrated in FIGS. 1 and 2, the means for supplying water conveniently takes the form of a water inlet line 15 connected at one end to any common water supply and at the other to valve 16 of any common variety which is actuated by a lever 17 or some such means. Depression or upward movement of lever 17 depending upon the type valve 16 employed will permit water to pass through valve 16 into water line 18 to which are connected a plurality of extensions 19 connecting line 18 and plugs 21 which threadably engage like ends of elongated members 9. Extension 19 communicates water from line 18 through plugs 21 into elongated members 9 where it can be heated and/or evaporated.

In the particular embodiments illustrated, the means for heating the water once introduced into the elongated members 9 conveniently take the form of gas burners 22 positioned beneath steam generating chamber 8. Burners 22 are fed with any type combustible gas through gas line 23 which communicates with both of burners 22. Gas flow to burners 22 is regulated by valve 24 controlled by thermostat 25 which is set by control dial 26. Temperature sensing element 27 extends from thermostat 25 into enclosure 2 between bottom plate 3 and plates 7 and 10 so that the temperature of enclosure 2 can be controlled by predetermined setting of dial 26. If the temperature of enclosure 2 exceeds the predetermined setting on dial 26, the thermostat 25 will restrict gas flow through line 23 and control heat addition to enclosure 2.

After ignition of burners 22, the operator of the device illustrated in FIGS. 1 and 2 can actuate lever 17 and introduce water into elongated members 9. Burners 22 heat elongated members 9 to such a temperature that the water introduced thereto will evaporate to effect steam generation producing steam flow through apertures 13 and 29 into enclosure 2.

With continued use, the steam generating chamber 8 will fill with a scale of minerals deposited by the evaporating water. In the embodiment illustrated by FIGS. 1 and 2 for example, the scale will form on the interior of elongated members 9 reducing the efficiency of heat transmission to the members. Scale also forms in apertures 13 and 29 which if allowed to collect will impede steam flow into enclosure 2. This scale because of the temperatures at which it is formed is most frequently very hard and difficult to remove from the steam generating chamber.

Prior art devices have been plagued with this scale formation and in many instances the device has to be almost completely disassembled to gain access to the steam generating chamber. Once access is gained to the dish shaped steam generating chamber employed by most of the devices, the scale is removed by use of a chisel or some such tool.

To simplify the cleaning problems of the prior art the steam generating chamber 8 of the device illustrated in FIGS. 1 and 2 carries plugs 28 threadably engaged in like ends of elongated members 9. In similar manner the opposite ends of the elongated members 9, FIGS. 1 and 2, carry plugs 21 threadably engaged thereon.

Plugs 28 and 21 may extend from the device at any readily accessible point thereon to permit ready access to them should elongated members 9 need cleaning.

To clean scales and deposit from the elongated members 9, either plugs 28 may be removed, or in the alternative both plugs 21 and 28 may be removed. A reamer, drill, swab or some such tool is then run through the members 9 to remove scale from the interior surfaces thereof and a similar tool may upon removal of plates 7 and 10 be used to remove scale from the registering apertures 13 and 29.

Because frequent removal of scale from apertures 13 and 29 may be necessary, the apertures are preferably provided with an annular insert of hardened metal to minimize enlargement of the apertures due to repeated drilling, reaming, swabbing, or the like.

Thus, it can be seen that steam chamber 8 may be readily cleaned after the simple removal of plugs 28 and/or plugs 21 and apertures 13 and 29 cleaned after removal of plates 7 and 10 all of which can be accomplished with minimal disassembly of the device and time consumption. Indeed in a preferred embodiment of the invention apertures 14 in plates 7 and 10 are positioned to register with apertures 13 and 29 so that plates 7 and 10 need not be removed to permit apertures 13 and 29 to be "drilled out."

FIGS. 3 and 4 illustrate an alternative embodiment of steam chamber 8 which is similar to the one illustrated in FIGS. 1 and 2, but which varies in some detail.

The embodiment illustrated by FIGS. 3 and 4 employs a central elongated un-apertured member 30 in each bank of elongated apertured members 32. Water is introduced into these central elongated members 30 through water inlet lines 31 like inlet lines 19 already described. Steam generated in the central member 30 communicates through elongated member communicating conduits 11 into one and/or both of the adjacently positioned elongated members 32 where it can be further evaporated and/or superheated. The middle member 30 is not provided with apertures so that primary generation of steam can be effected therein and superheating of steam can be effected in the adjacently positioned member 32 before the steam is communicated to enclosure 2. Thus, articles to be heated with the steam will not become soggy by contact with saturated steam, if by the nature of the article such is possible.

While the embodiment of the steam chamber 8 illustrated in FIGS. 1 and 2 can of course produce superheated steam if burners 22 are so adjusted, the embodiment of the invention illustrated by FIGS. 3 and 4 is preferred.

To permit easy cleaning or removal of scale deposits, the elongated members 30 are provided with plugs 21 and 28 like elongated members 9 of FIGS. 1 and 2. Elongated members 32 are provided at both ends with plugs 28, and as is obvious the steam chamber 8 of FIGS. 1 and 2 and the steam chamber 8 of FIGS. 3 and 4 are cleaned by similar methods already described.

As is obvious in the embodiment illustrated in FIGS. 3 and 4, scale will also form on the inside surface of connecting conduits 11 which communicate the elongated members 30 and 32. To permit ready access to the conduits 11 for easy removal of scale therein the conduits 11 threadably carry plugs 33 in the outermost segments thereof. Inasmuch as the conduits 11 are axially aligned in each bank of elongated members 30 and 32, a drill, swab, or some such tool already referred to can be injected and used to remove scale from the conduits after removal of plugs 33.

Obviously various changes may be made in the embodiments illustrated and various other embodiments may be conceived and constructed, all of which would embody the invention. For example, electrically resistive heating rods could be used as a heat source rather than the gas burners illustrated.

Additionally, with minor alterations the device could be used as a sterilizer or pressure cooker.

Further, while specific terms have been used to describe the disclosed embodiments, these terms should not be construed to limit the invention as described in the following claims.

What is claimed is:
1. An apparatus for heating articles by contacting the articles with steam comprising:
enclosure means which include means for supporting the articles to be heated;
a steam generating chamber communicating through an apertured plate with the enclosure for introducing steam thereto, said chamber comprising:
a plurality of elongated members, at least one of said elongated members having an opening through which water may be introduced into said member, and at least one end of each of said elongated members having a removable plug engaged therein to permit easy access to the interior of the elongated member whereby rapid and efficient removal of materials deposited in said elongated members is facilitated;

means for introducing water into the steam generating chamber; and means for heating and vaporizing water introduced into the steam generating chamber.

2. An apparatus for heating articles by contacting the articles with steam comprising:

enclosure means for containing the articles to be heated;

a steam generating chamber communicating with the enclosure for introducing steam thereto, the steam generating chamber comprising at least one elongated member having an opening through which water in liquid or vapor state can be introduced thereto and at least one end which is closed by an easily removable plug to permit easy access to the interior of the elongated member for rapid and efficient removal of materials deposited therein by evaporating water, said steam generating chamber being further characterized by a removable plug carried by both ends of the elongated member for permitting access to the interior of the member from either or both ends with the water inlet being positioned intermediate the ends of the elongated member;

means for introducing water into the steam generating chamber; and means for heating and vaporizing water introduced into the steam generating chamber.

3. The device of claim 2 wherein said elongated member comprises:

a pipe having substantially uniform cross section both ends of which are threaded to permit engagement of correspondingly threaded plugs.

4. An apparatus for heating articles by contacting the articles with steam comprising:

enclosure means for containing the articles to be heated;

a pair of substantially parallel apertured plates carried by the enclosure means, one of the plates defining the bottom of the enclosure and the other, a supporting plate, being maintained in a spaced relationship directly thereabove for supporting articles to be heated;

a steam generating chamber carried beneath the enclosure means for introducing steam thereto, the steam generating chamber comprising, at least one elongated member disposed beneath the bottom plate adjacent thereto and having apertures therein which register with the apertures in the bottom plate, the elongated member also having an opening through which water in liquid or vapor state can be introduced thereto and at least one end which is closed by an easily removable plug to permit access to the interior of the member for rapid and efficient removal of materials deposited therein by evaporating water;

means for introducing water into the steam generating chamber;

means for heating and vaporizing water introduced into the steam generating chamber permitting the steam generated thereby to pass through the registering apertures into the enclosure means and contact articles placed on the supporting plate.

5. The device of claim 4 further characterized by:

a removable plug carried by both ends of the elongated member for permitting access to the interior of the member from either or both ends with the water inlet being positioned intermediate the ends of the elongated member.

6. An apparatus for steam heating of articles comprising:

enclosure means which includes means for supporting the articles to be heated;

a steam generating chamber in communication through an apertured plate with the enclosure means for delivering steam thereto, the steam generating chamber comprising:

a plurality of elongated members in communication one with the other through conduits connected therebetween, one of the elongated members being adapted to receive water in a liquid state for generation into steam which is communicated to an adjoining elongated member for superheating of the steam before introduction into the enclosure means, each of said elongated members having a plug secured in at least one end thereof, the plug being easily removable from said elongated members to permit access to the interior of the member, whereby rapid and efficient removal of materials deposited therein is facilitated;

means for introducing water into the steam generating chamber; and means for heating and vaporizing water introduced into the steam generating chamber.

7. An apparatus for steam heating of articles comprising:

enclosure means for containing the articles to be heated;

a pair of substantially parallel apertured plates carried by the enclosure means, one of the plates defining the bottom of the enclosure and the other, a supporting plate, being maintained in a spaced relationship directly thereabove for supporting articles to be heated;

a steam generating chamber in communication with the enclosure means for delivering steam thereto, the steam generating chamber comprising:

a plurality of elongated members in communication one with the other through conduits connected therebetween, one of the elongated members being adapted to receive water in a liquid state for generation into steam which is communicated to an adjoining elongated member for superheating of the steam before introduction into the enclosure means through apertures in the adjoining members which register with apertures in the bottom plate of the enclosure means, at least one of the elongated members having a plug secured in at least one end thereof, the plug being easily removable therefrom to permit access to the interior of the member for rapid and efficient removal of materials deposited therein by the steam generating process;

means for introducing water into the elongated member adapted to receive the same; and means for heating and vaporizing water introduced into the steam generating chamber.

8. An apparatus as described in claim 6 wherein:

the conduits connecting the elongated members are axially aligned with and disposed perpendicularly to said elongated members, and are provided with removable plugs to permit access to the interior of the conduits.

9. An apparatus as described in claim 7 wherein:

the conduits connecting the elongated members are axially aligned and provided with a removable plug to permit a cleaning instrument to be injected into the conduits to remove scale therefrom.

References Cited by the Examiner

UNITED STATES PATENTS

| | | | |
|---|---|---|---|
| 489,718 | 1/93 | Scott | 126—369 |
| 541,637 | 6/95 | Sewell | 122—361 X |
| 616,095 | 12/98 | Foerg | 126—369 |
| 958,842 | 5/10 | Stephenson | 122—361 |
| 1,174,590 | 3/16 | Leibbrandt | 126—20 |
| 1,809,867 | 6/31 | Rittberger | 126—369 X |
| 2,674,935 | 4/54 | Lewis et al. | 126—369 X |
| 2,973,705 | 3/61 | Klemm | 126—20 X |

FOREIGN PATENTS 184,231 7/22 Great Britain.

JAMES W. WESTHAVER, *Primary Examiner.*

ROBERT A. DUA, *Examiner.*